*L. F. Sheppard,*
*Artificial Teeth.*

N°. 9,587.   Patented Feb. 15, 1853.

UNITED STATES PATENT OFFICE.

LOUIS F. SHEPPARD, OF ALHAMBRA, ILLINOIS.

ARTIFICIAL TOOTH.

Specification of Letters Patent No. 9,587, dated February 15, 1853.

*To all whom it may concern:*

Be it known that I, LOUIS F. SHEPPARD, of Alhambra, in the county of Madison and State of Illinois, have invented certain new and useful Improvements in the Construction of Artificial Teeth for the Human Mouth; and I do hereby declare that the same is described and represented in the following specification and drawings.

The nature of my invention consists in the application of a suitable metallic plate to the back and masticating portion of the tooth or teeth so as to protect them more effectually against injury in use; the plate being so constructed as to cover the ends of the teeth which perform the chewing, and the back of the teeth may be partially, or entirely covered as may be most desirable, to connect the covering of the ends to the plate to which the teeth are fastened and which connects them together, the ends of the teeth being fitted to receive the metallic plate by grinding or otherwise.

To enable others skilled in the art to make and use my improvements I will proceed to describe their construction and use referring to the drawings above mentioned.

Figures 1, 2, 3:
Figure 1, represents the back of a tooth covered with my improved plate fastened to it by the pivots $d$. $b$ represents that portion of the tooth which is fitted to the artificial gum or plate to which the teeth are fastened by soldering that end of the plate next to $b$ to the artificial gum or plate which is to connect a series of teeth together.
Fig. 2, represents the front of a tooth.
Fig. 3, is a section representing Fig. 1, cut perpendicularly through the center of the pivots.

To apply my improvements to the artificial porcelain teeth such as are in common use, I grind off the end used in mastication at an angle of about forty-five degrees with the back of the tooth, as represented by the line D and then put on the plate $d'$ and fasten it by riveting or soldering to the pivots, so as to leave a triangular space between the end of the plate $d'$ and the point of the tooth $b'$ into which space I fit the piece of metal $c$ and solder it to the plate $d'$ and file and burnish it smooth so as to make a perfect metallic end to the tooth for the purpose of masticating the food which will protect the porcelain portion of the tooth from injury and render it less liable to be broken by chewing hard substances. The tooth thus prepared is fastened to the metallic gum by soldering the end $b$ of the plate $d'$ to said gum or plate.

I contemplate that the ends of porcelain and other teeth may be made in the form desired so as to save the necessity of grinding; also that the plate applied to the back of the tooth, may be made with a projection to form the end of the tooth and to fit the porcelain portion of it, instead of soldering in the piece $c$ above described; and also that the construction may be modified in various ways without departing from the principles of the improvements which I have invented.

What I claim as my invention and desire to secure by Letters Patent is—

Extending a suitable metallic plate over the masticating portion of artificial teeth to protect them more effectually against injury from use substantially as above described and set forth in the foregoing specification.

LOUIS F. SHEPPARD.

Witnesses:
 JOHN L. SMITH,
 J. F. WOLTAVO.